United States Patent

[11] 3,582,640

| [72] | Inventor | Jack Ellard<br>Baltimore, Md. |
|---|---|---|
| [21] | Appl. No. | 737,398 |
| [22] | Filed | June 17, 1968 |
| [45] | Patented | June 1, 1971 |
| [73] | Assignee | The Duralite Manufacturing Company<br>Baltimore, Md. |

[54] ROOF ASSEMBLY AND LIGHTING SYSTEM
9 Claims, 11 Drawing Figs.

[52] U.S. Cl. .................................................. 240/8.2,
240/7.1, 296/137
[51] Int. Cl. ....................................................... B60g 1/26
[50] Field of Search ........................................... 240/7.1,
8.2, 8.3, 57; 339/21; 296/28, 137; 180/89

[56] References Cited
UNITED STATES PATENTS

| 3,032,646 | 5/1962 | Chieger | 240/8.2 |
| 3,321,731 | 5/1967 | Goldbaum | 240/8.2X |
| 3,061,364 | 10/1962 | Tantlinger et al. | 296/137 |
| 3,107,061 | 10/1963 | Morgan | 240/8.2 |
| 3,451,035 | 6/1969 | Baldwin | 240/8.2X |

*Primary Examiner*—Samuel S. Matthews
*Assistant Examiner*—Joseph F. Peters, Jr.
*Attorney*—Beveridge & DeGrandi ABSTRACT: A simplified system of clearance, marker and identification lights for a road vehicle in which the number of individual lights necessary to comply with regulations is reduced and the lights are positioned for better effect and installed from the exterior without perforations through the body of the vehicle by the use of a sloped wall roof rail having a cable supporting groove and a self-tapping screw slot for mounting the lamps including a diagonal corner section for mounting a light at each corner serving both as a clearance and marker light.

PATENTED JUN 1 1971  3,582,640
SHEET 1 OF 2
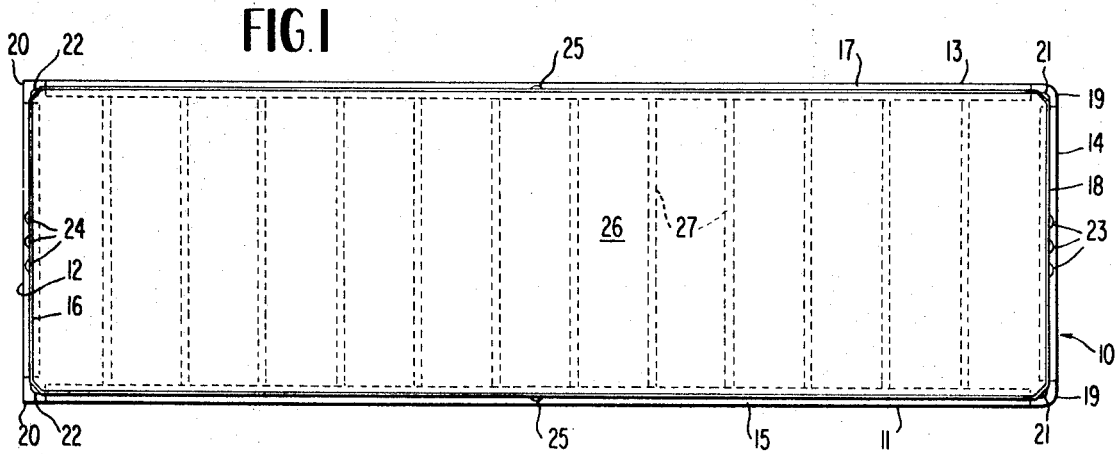
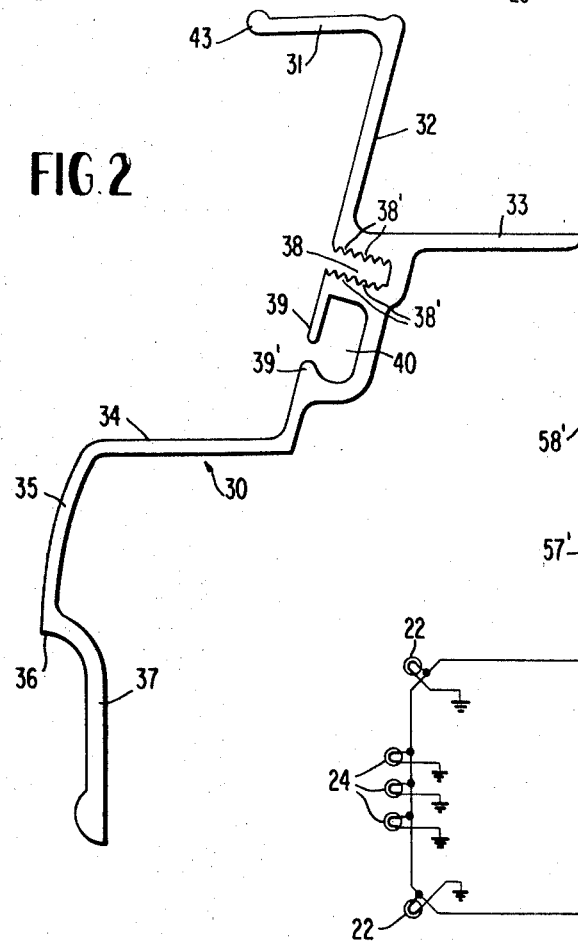
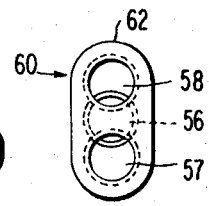
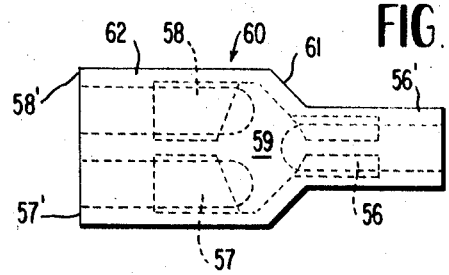
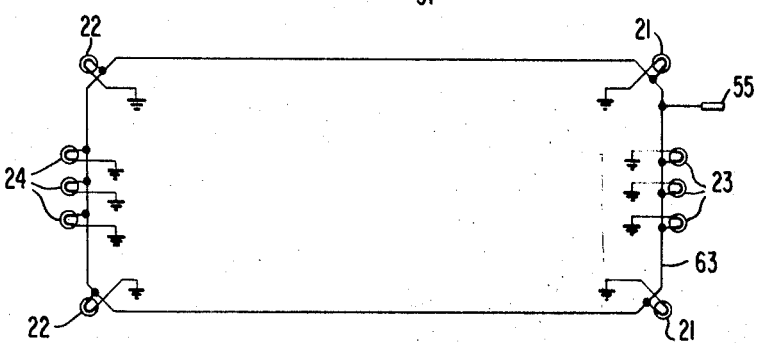
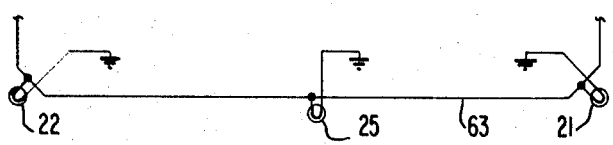
INVENTOR.
JACK ELLARD
BY
Browne, Schuyler & Beveridge
ATTORNEYS INVENTOR.
JACK ELLARD
BY
Browne, Schuyler & Beveridge
ATTORNEYS

ROOF ASSEMBLY AND LIGHTING SYSTEM

It has been known heretofore to provide a roof rail or quarter panel in which the marker lights are mounted on the back wall of an outwardly facing trough wherein the rail serves to join side and roof panels, generally including vertical struts and horizontal rib members, respectively. Various arrangements have been proposed for mounting such lights but have not provided the desired simplicity of wiring, usually requiring holes drilled into the interior of the vehicle body, thereby sacrificing watertight integrity. It has likewise been necessary to expend considerable time in the mounting of such marker lights because of the individual boring and tapping of holes. Most roof rail arrangements have also involved the mounting of marker lights so that they extend beyond the side panels and are subject to damage as the vehicle may move in contact with some obstruction on either side thereof. In addition, a vehicle requiring a number of lights on each side and end for identification and marking purposes has been overly expensive in view of the number of lights which have to be installed. The number of lights required has been dictated by state law or other regulations requiring a light at each side of the vehicle at the front and the back and a light at each end of the vehicle on each side near the corner. Compliance with these requirements has necessitated generally 11, 13, 14 or 16 separate light installations in order that two or three marker lights show at each side and five marker, clearance and identification lights at each end. Also to be noted is the desirable feature not realized in combination with other features that the lighting system be installable entirely from the exterior of the vehicle without the expense of drilling individual holes for insertion of fastening screws. Heretofore when conventional lights have been installed from the exterior they have generally protruded beyond the vehicle sides or have caused loss of space within the vehicle because of the deep space required for an exterior mounting which would then extend into the rectangular space desired for load purposes. In addition, ground level visibility of trough mounted lights, where fully recessed, has proven inadequate.

It is accordingly an object of the present invention to provide a marker lighting system avoiding each of the above difficulties encountered in prior art clearance, marker and identification light systems and mountings.

It is a further object of the invention to provide an improved roof rail accepting lights mounted anywhere therealong and including a sloped backwall for elevating the filaments of lights wholly protected therein in which the roof rail does not extend appreciably into the loading space.

Another object of the invention is to provide an improved corner section for joining lateral and longitudinal roof rails and providing for mounting a combination clearance and marker light on the corner section visible equally from a side and an end of the vehicle.

Another object is to provide a channel mounting for retaining one or more power cables and electrical connectors within a roof rail so that a light may be connected at any position therealong.

A further object is to provide a mounting slot in a roof rail for receiving fastenings by which lights may be located at any desired position along the upper periphery of the sides and ends of the vehicle. These and other objects of the invention will be more clearly understood as the description proceeds in connection with the drawings in which:

FIG. 1 is a top view of a vehicle having a roof rail and marker lighting system according to this invention;

FIG. 2 is a cross-sectional view of a rail according to FIG. 1;

FIG. 7 is a wiring diagram of a lighting system according to FIG. 1;

FIG. 7A is a partial wiring diagram showing three side lights;

FIG. 8 shows a connector for use in a rail or corner section as in FIG. 2, and

FIG. 9 is an end view of a connector according to FIG. 8.

Figure 3:
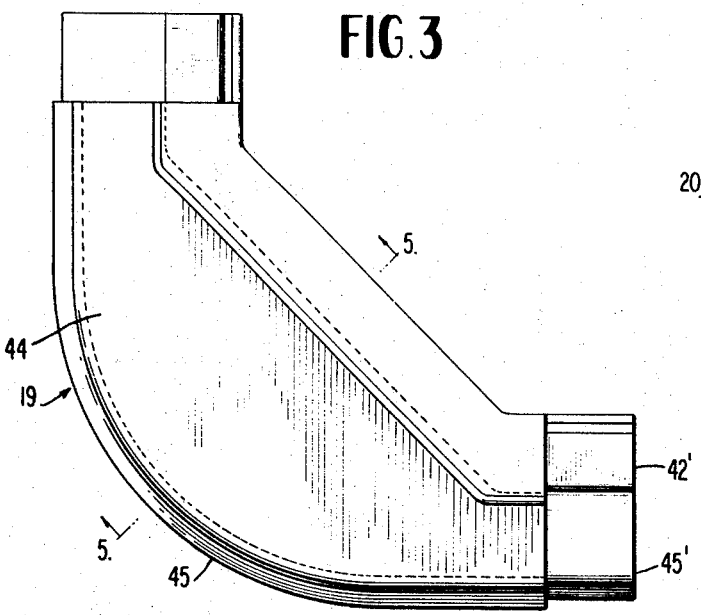
FIG. 3 is a top view in reduced scale of a corner section for connecting side and end rails according to FIG. 2.

Referring now to the drawings there is shown in FIG. 1 a vehicle body 10 having sides 11 and 13 and ends 12 and 24 along the top edges of which roof rails 15 and 17 are disposed to join side panels and top panels while roof rails 16 and 18 extend along the ends of the vehicle to join top panels to end panels. Each junction of a side roof rail and end roof rail at the front of the vehicle is equipped with a junction member or corner section 19 of rounded outer contour as in FIG. 3 to correspond with a rounded corner post of the vehicle and to provide a smooth flush fitting with the side and end panels as well as the top panels. Each rear corner is likewise fitted with a rail corner section such as at 19 or may have a squared corner as at 20 in FIG. 3A according to the shape of the corner post employed at either end of the vehicle. Corner sections are equipped with combination side-and-end lighting fixtures or lights, preferably mounted at a 45° angle to the side thus to face equally in lateral and longitudinal directions of the vehicle, serving both as an end and a side light at the vehicle corner, under applicable Federal Rules. Lighting fixtures or lights 21 shown at the forward corners of the vehicle are preferably like lighting fixtures 22 shown at the rear of the vehicle, and fixtures 23, 24 and 25 along the roof rails. Depending upon the size of the vehicle a differing number of center identification lights may be provided at the end of the vehicles, three being shown at the forward end at 23 and three being shown at the rear end at 24. Large vehicles may also require side lights between the positions of lights 21 and 22 as illustrated at 25 at the lateral centers of the vehicle. The vehicle top 26 comprises one or more panels supported by ribs as at 27 extending between siderails 15 and 17.

In FIG. 2 a side or end rail according to this invention is indicated generally at 30 comprising a top flange 31 of generally horizontal configuration extending outwardly from a backwall or channel bottom portion 32 from which extends a roof rail supporting flange 33. A second horizontal portion or channel base 34 is generally parallel with flange 31 and forms with backwall 32 a U-channel comprising portions 31, 32 and 34. At the outer limit of the channel base 34 there is a downturned portion 35 extending to overlie the upper extremity of the side panels of the vehicle. This outer portion comprises a rigid rub rail member suitable for incidental impact with objects with which the upper portions of the vehicle may come in contact. Preferably the rub rail portion of the roof rail is turned inwardly at its lower edge to leave an overhang 36 joined to vertical flange 37 on the inside of which the side panel skin may be attached.

The construction illustrated and thus described provides means for securing panels having a smooth exterior skin in a manner to protect the upper ridge of the panel skin from entry of water by virtue of the overhang at 36. Flanges 31 and 37 may have an edge bead for added strength and the bead at 43 serves as an abutment for the roof skin to form a flush joint. The roof skin may be riveted to flange 31 without the need for through holes in the vehicle. Sealing compound between roof skin and flange is normally employed to retain watertightness.

Portions 34, 35 and 36 comprise a rigid and strong support member further strengthened by the U-channel formed of portions 34, 32 and 31 which is further reinforced by flange member 33 to make of the entire rail a highly rigid but light and inexpensive construction suitable for manufacture by extrusion. The thickness of the metal in the various sections described may vary somewhat but is appropriately of the order of one-eight inch or less to form a sufficiently strong rigid structure serving as a quarter panel or roof rail for the vehicle.

Backwall 32 is generally of plain configuration but has provision for variably mounting and connecting the marker lights at any position therealong formed as slots or grooves in the backwall 32. A slot 38 runs preferably throughout the entire length of the rail and comprises a parallel walled recess of sufficient width and depth to admit self-tapping screws, or if a ridged groove 38, 38' is used, to admit uniform thread or machine screws by which a flat-backed lamp fixture may be attached to wall 32. Ridges 38' are optionally formed in an extrusion to receive screws, and when displaced at the upper or lower face as illustrated, accept a standard machine screw such as a No. 10. Above or beneath slot 38 is a longitudinal groove 40 formed in the backwall 32 and having a lip 39 at one edge thereof and lip 39' at the other edge thereof suitable for retaining therein a cable comprising one or more conductors insulated from the walls of groove 40. The dimensions of the groove 40 are such as to receive the cable together with a splicing or connector fixture by which a marker light may be connected while carrying through the lamp a connection to the next succeeding marker light. For this purpose a groove in the order of one-fourth by one-half inch is formed in rounded configuration to avoid abrasion or sharp corners by which the cable insulation might become worn during use.

A feature of the lighting system and mounting thereof is the corner section supporting a corner light and continuing the roof rail configuration around a front or rear corner. Illustrated in FIG. 3 is a rounded front corner for vehicle bodies constructed to join in a flush exterior configuration the abutting end and siderail and in conformity to the shape of a cooperating corner post.

Figure 3A:
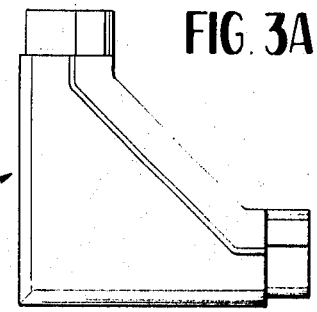
FIG. 3A is a top view in further reduced scale of an alternate form of a corner connector.
Figure 4:
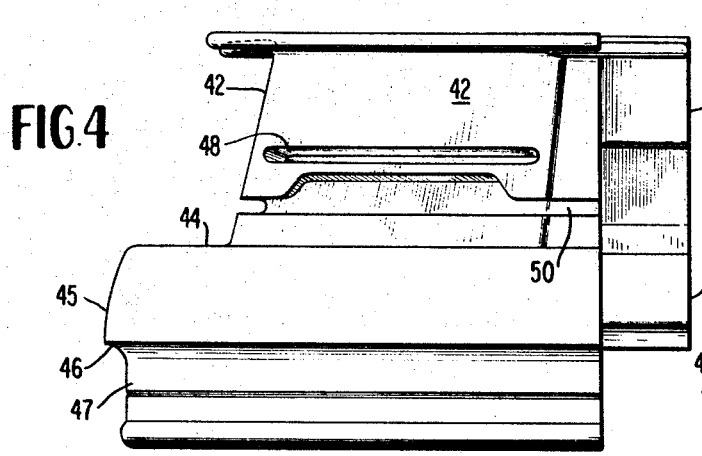
FIG. 4 is a side elevational view of a corner section as in FIG. 3.
Figure 5:
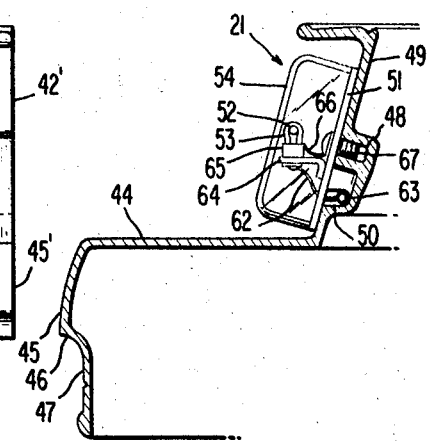
FIG. 5 is a sectional view taken along line 5-5 of FIG. 3.
Figure 6:
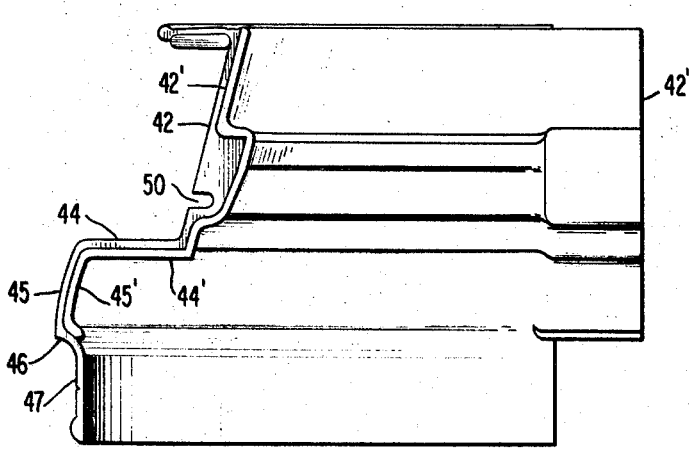
FIG. 6 is an end view of a corner section according to FIG. 4 showing an offset flange portion for engaging a siderail.

In FIG. 3A a corresponding rear corner section is shown for use with a square cornered post. Either corner section has a flange corresponding to flange 37 as illustrated at 47 in FIG. 4 beneath the overhanging ridge 46 corresponding to overhanging portion 36 of FIG. 2. Rub rail portion 45 similarly corresponds to rail portion 35 of FIG. 2 and has an offset matching portion 45' at the extremities of the corner section formed to fit into and behind similar rub rail portions of a side or end rail as in FIG. 2. Similarly, the light mounting channel consists of upper flange 41 and offset portion 41', a backwall 42 with offset extension 42', and a base wall 44 and offset portion 44' in which offset portions are shaped to fit into and behind portions 32—35 of the side or end rail previously described, thereby providing a flush continuation of the channel and rub rail around each corner. Cable groove 50 corresponds in position to the lower portion of groove 40 and serves to hold the cable as it extends from a side or end rail groove 40 to the groove in the diagonal portion of the corner section as illustrated in FIG. 5 at 50. Similarly, corner section slot 48 is generally aligned between the ends of slots 38 of the side and end rails for the mounting of a light fixture, in the manner previously described, at a variable position along the diagonal wall 49.

It will be understood that a roof rail corner section will be preferably shaped to conform with the corner post which it secures to the side and end panels as well as to the roof panel at the corner of the vehicle. For this purpose a rounded corner casting will be appropriately shaped to conform to the configuration of the exposed portion of a rounded corner post, but in the case of a rear post it is conveniently square in order to join rear and side panels not having a rounded corner post, as when the rear end of the vehicle is desired to be fully opened by extending rear doors throughout the full width of the vehicle. For this purpose the configuration of FIG. 3A is a minor modification of that shown in FIG. 3, differing only in the corner configuration below the mounting channel, the light mounting fixture area being the same for either a front or a rear corner section.

FIG. 7 shows one manner of connecting lights in which front and rear groups of three lights are spaced approximately 7 inches apart centered about the centerline of the vehicle. Front corner lights 21 are mounted above the corner section horizontal portion 44, having the backplate 51 of the light fixture on the sloped wall 49 of the channel, and rear light fixtures 22 are similarly mounted above the corresponding horizontal portion of the corner section 20 with the back of the lamp secured against the sloping wall of the diagonally arranged portion 49 of the light channel.

It may be noted that each of the lights consists generally of a plain backwall 51 of vertical dimension in the order of 2 inches wherein the filament 52 is contained in a bulb 53 projecting forwardly from this backwall at an angle to the horizontal such that the filament is elevated substantially above the position which would be occupied by a similar light fixture mounted on a vertical wall. This feature has the advantage of elevating the filaments for considerably better visibility at the sides and ends of the vehicle. The importance of this feature resides in the fact that the roof rail of this invention has wall 32 recessed and backwall 42 further recessed so that the lens 54 of the light is not exposed to objects brushing along side portion 36 of the roof rail. In order to maintain the maximum load space within the vehicle the height of the channel between flange 31 and base 34 is made as small as possible to extend only moderately below ribs 27 so that the backwall 32 may be recessed sufficiently to accommodate the full thickness of the light. Since the outer edge of base 34 or 44 interferes with light passing from the center of the channel downwardly toward observers immediately at the side and rear of the vehicle, a deeply recessed channel might prevent the showing of the light at the level of the roadway near the vehicle. Elevating the filament by sloping the backwall permits a recessing with less effect upon the free space within the vehicle, and, at the same time, a higher elevation for the source of light is obtained by sloping the backwall appreciably, without increasing the space between flanges 31 and 34, whereby the forwardly extending filament is considerably raised above the centerline of the channel. A smaller channel and higher light is obtained. In this manner marker lights are caused to provide maximum visibility closer to the vehicle along the sides and rear where this visibility is especially desired.

FIG. 5 illustrates the arrangement described in which a corner-mounted light 21 has a backwall 51, filament 52, bulb 53 and lens 54. Cable 63 is connected by lead 62, preferably within the housing of light 21 to the base of bulb 53, which is supported by bracket 64 on base 51 having a socket 65 grounded by conductor 66 as at the mounting screw 67 which fastens light 21 to the channel back.

In FIG. 7A is shown a lighting arrangement where a light 25 is to be shown at the mid section of each side is illustrated diagrammatically.

In FIG. 8 is illustrated a connector suitable for completing the connection from a power supply cable 55 around the periphery of the vehicle top at junctions for each light by which current is fed to each of the marker lights. In this construction an insulated three-way terminal has at one end a metallic socket 56 suitable for the insertion of a standard male jack secured to the end of a length of insulated cable. At the opposite end of the connector are two adjacently spaced receptacles 57 and 58 similar to receptacle 56 one to receive a cable end similar to that inserted at 56 for continuing the cable around the periphery of the vehicle. The other receptacle 58 receives a similar jack which connects by a lead to the filament of one of the marker lights, the other side of the filament being grounded to the vehicle body. A three-way terminal or connector illustrated generally at 60 has a metallic body 59 surrounded by an insulating cover 61 including sleeve 56' of sufficient length to overlap the insulation on the cable terminating at the jack inserted in socket 56 for purpose of maintaining a watertight connection. Sockets 57 and 58 are surrounded by insulating sleeves 57' and 58' having parallel openings dimensioned to receive metallic sockets 57 and 58 the insulating sleeve material extending out past the termination of the sockets 57 and 58 to similarly engage the insulation on the continuation of the power cable and the lead extending to the particular lamp which it is to feed.

Insulation or cover 61 is preferably a molding conforming to the interior of the cable supporting groove 40 shown in FIG. 2 so that when placed therein it fits without undue vibration or tendency to be removed by lateral stresses. Constructed in this manner the cable groove 40 receives one or more cables 63 and a number of connectors 60 corresponding to the number of lights to be installed and the cable 63 extends entirely around the periphery of the vehicle to a connector 55 by which power is supplied from a battery of the vehicle, cable 63 being completed through a connector 60 at each light. In this manner each light in the assembly is powered by a tap in a loop of wire such that two feed lines, for example of positive potential, extend oppositely around the rail to the particular light to be energized. Switching control of the lighting system is not a part of this invention and is not further described herein except to note that a down lead from connector 54 is conveniently arranged at the front of the vehicle for connection by a cable to a towing vehicle or to a battery on a lower portion of the vehicle body.

While the invention has been illustrated and described with respect to a preferred embodiment it will be understood that various modifications may be made within the spirit of the invention and the scope is intended to be limited only according to the attached claims and equivalents thereof.

What I claim is:

1. In a road vehicle body having end, side and top panels joined at a peripheral line at which marker lights are to be displayed for visibility at end and side locations, an integral roof rail, comprising
   a vertical flange member for engaging a vertical panel,
   an upward extension of said flange member extending outwardly therefrom to form a ledge for providing weather protection for perforations in the flange member,
   a substantially horizontal channel portion joined to said upward extension directed inwardly therefrom,
   a wall portion upstanding from said inwardly directed channel portion,
   a substantially horizontal flange member extending outwardly from the upper portion of said wall portion to an amount less than the width of said horizontal channel portion, to form therewith and with said wall portion an outwardly and upwardly open channel as a base for receiving lighting fixtures, and
   a corner position for joining transverse and longitudinal portions of said integral roof rail wherein said corner portion has a diagonally arranged channel portion forming a continuation of said rail between said lateral and longitudinal portions thereof, said diagonal portion being for mounting a marker light centrally thereof for projecting light longitudinally and laterally along the vehicle body.

2. A roof rail according to claim 1, wherein said upstanding wall portion is inclined inwardly toward said horizontal flange member to provide a sloped base for mounting rectangular lamp housings at a uniform angle of inclination from the horizontal, said wall portion further including groove means positioned to receive threaded fastenings for securing said housings at variable positions along the length of said rail.

3. In a road vehicle body having therearound an open channeled outwardly facing side and end roof rails for mounting marker lights,
   a corner fitment for joining adjacent end and side roof rails,
   vertical flange means including paired perpendicular portions for attachment to an upper edge of a side and end body portion and outwardly facing light fixture mounting means, comprising
   a lower horizontal flange integrally connected to said vertical flange means including an end portion aligned with a side panel, an end portion aligned with an end panel and a middle portion aligned intermediately therebetween,
   an upper horizontal flange forming an upper mounting surface for a roof member and having end and middle portions corresponding to said portions of said lower horizontal flange,
   an upstanding backwall integrally connected to space said horizontal flanges from each other including a middle portion disposed for the mounting of lighting fixtures at a substantial angle from the transverse and longitudinal directions on said vehicle body, and
   continuous slot means internally ridged on both sides formed horizontally in said backwall for receiving variably positioned mounting fastenings.

4. A corner fitment according to claim 3, said backwall including cable retaining means comprising a horizontal groove therein extending at least the length of said middle portion.

5. A corner fitment according to claim 3, said right-angled vertical flange means including an arcuate portion defining a weathertight closure for the top of an arcuate corner post of said vehicle.

6. A corner fitment according to claim 3, said lower horizontal flange extending outwardly at said end portions substantially beyond said upper horizontal flange.

7. A corner fitment according to claim 6, said backwall being substantially planar and inclined from the vertical to form a sloped mounting for lighting fixtures thereby to elevate forward portions thereof relative to said backwall.

8. In a road vehicle body having side and end panels and a roof member,
   a pair of siderails each including a vertical flange for attachment to side panels,
   an outwardly facing U-channel comprising a channel leg attached to said vertical flange, a web portion inwardly inclined with respect to said panels, and a second channel leg attached to said roof member,
   a pair of end rails similar in section to said siderails having one channel leg attached to said end panels,
   a corner fitment at each of a plurality of the corners of the vehicle having end portions forming continuations of said U-channels of adjacent said side and end rails and including a middle portion disposed at substantially 45° to adjacent side and end rails to form a diagonal base for a marker light facing upwardly, outwardly, in part laterally and in part longitudinally of the vehicle, and
   a marker light centrally mounted in said base.

9. In a road vehicle body having end, side and top panels joined at a peripheral line at which marker lights are to be displayed for visibility at end and side locations, an integral roof rail, comprising
   a vertical flange member for engaging a vertical panel,
   an upward extension of said flange member extending outwardly therefrom to form a ledge for providing weather protection for perforations in the flange member,
   a substantially horizontal channel portion joined to said upward extension directed inwardly therefrom,
   a wall portion upstanding from said inwardly directed channel portion,
   a substantially horizontal flange member extending outwardly from the upper portion of said wall portion to an amount less than the width of said horizontal channel portion to form therewith and with said wall portion an outwardly and upwardly open channel as a base for receiving lighting fixtures, and
   linear groove means having screw holding side ridges formed in the outward face of said wall member for receiving fastenings to attach said lighting fixtures at variable locations along the length of said rail.